Dec. 15, 1925.

L. C. VANDERLIP 1,565,874

MOTOR VEHICLE LOCK

Filed June 4, 1923    2 Sheets-Sheet 1

Inventor:
Louis C. Vanderlip.

Dec. 15, 1925.  
L. C. VANDERLIP  
MOTOR VEHICLE LOCK  
Filed June 4, 1923

1,565,874

2 Sheets-Sheet 2

Inventor:  
Louis C. Vanderlip.

Patented Dec. 15, 1925.

1,565,874

UNITED STATES PATENT OFFICE.

LOUIS C. VANDERLIP, OF ELKHART, INDIANA.

MOTOR VEHICLE LOCK.

Application filed June 4, 1923. Serial No. 643,158.

*To all whom it may concern:*

Be it known that I, LOUIS C. VANDERLIP, a citizen of the United States, residing in the city of Elkhart, Elkhart County, and State of Indiana, have invented certain new and useful Improvements in Motor Vehicle Locks, of which the following is a specification.

This invention relates to motor car steering mechanism, and particularly to locking means therefor.

An object of this invention is to provide a steering post lock for a motor car of the Ford type in which planetary gearing is used in the steering head. Another object of the invention is to provide a steering wheel lock for the Ford motor car type in which the steering wheel and steering post are rendered non-rotatable when the device is locked against unauthorized use.

A third object of the invention, and a very important one, is to provide means for locking the steering wheel of a motor car of the Ford type in a non-rotatable position and in any one of numerous possible locking positions. In devices of this character it is the present practice to lock the steering wheel against rotation in only a few possible locking positions, the limited number of locking positions being due to the nature of the inventions now in use.

Figure 1:
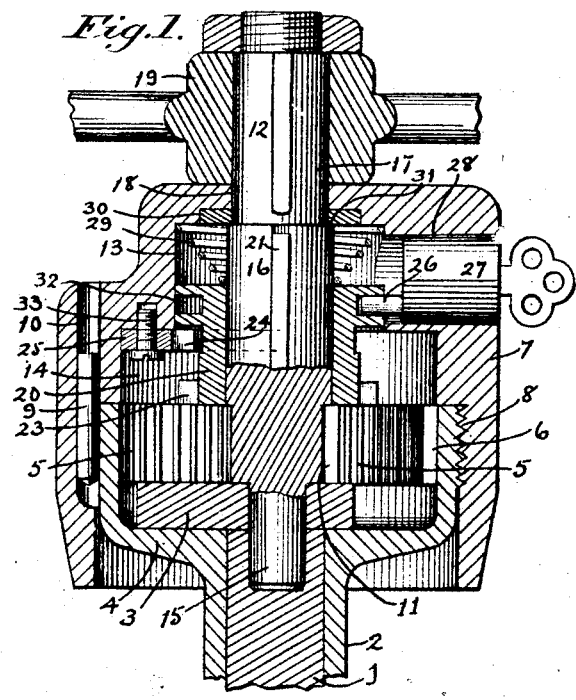
Figure 4:
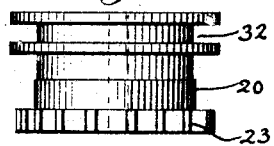
Figure 6:
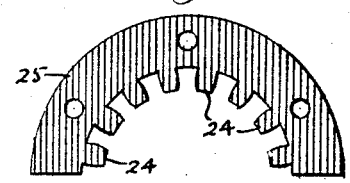
Figure 5:
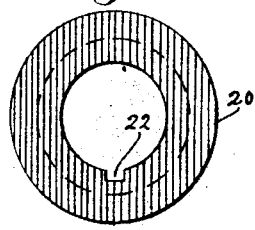
Figure 2:
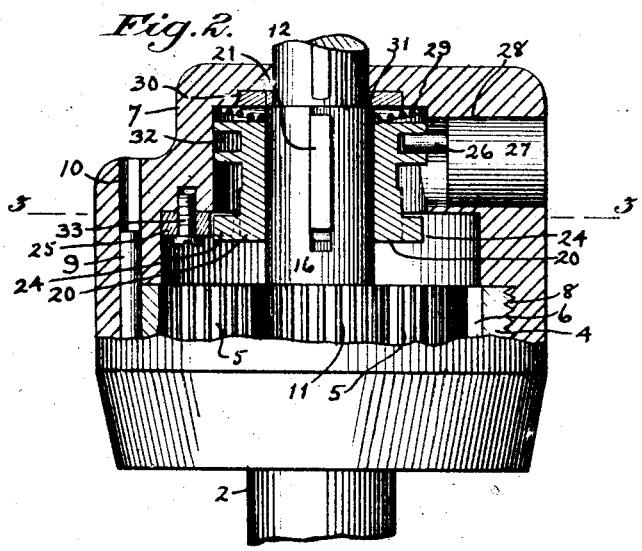
Figure 3:
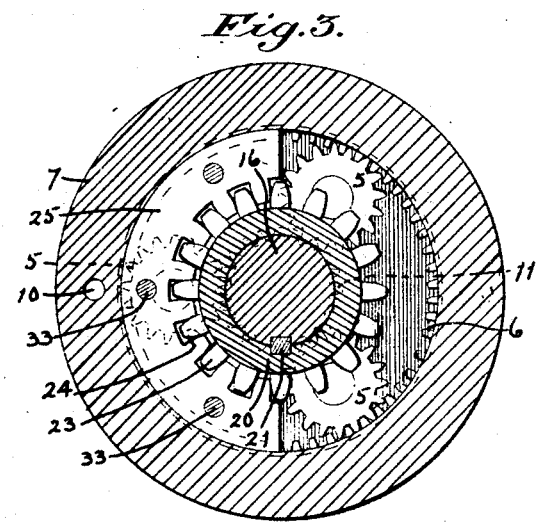

The preferred embodiment of my invention is illustrated in the accompanying drawings in which Figure 1 is a section in elevation through a Ford motor car steering head to which my invention is applied, and illustrating the parts in the driving position; Fig. 2 is a similar view, in fragment, illustrating the parts of the device in the locked position; Fig. 3 is a section taken on the line 3—3 of Fig. 2; Fig. 4 is a view in side elevation of the movable clutch element; Fig. 5 is a top plan view thereof; and Fig. 6 is a plan view of the stationary clutch element alone.

Similar numerals of reference indicate like parts throughout the several views on the drawings.

Reference to the drawings in detail indicates that the numeral 1 represents the top end of the usual steering post of a Ford motor car, said post being rotatably arranged within the usual hollow steering column 2 and provided with the usual head 3 which is arranged within the usual planetary gear housing 4 mounted upon the top end of the column 2.

Numerals 5, 5 indicate the usual driven gears of the planetary gearing, said gears being mounted upon the post head 3 in the well known manner and meshing with the usual annular interior rack element 6 formed on the housing 4 for steering post actuation, also well known in the art. The numeral 7 indicates a housing cap or cover which is screw threaded upon the exterior of the housing 4 at 8, said cap being secured against removal from the housing by a pin 9 disposed in the pin chamber 10 in cap 7 and driven transversely of and through the housing threads 8.

The numeral 11 indicates the sun-gear, or driving pinion, of the steering head planetary gearing which gear remains in constant mesh with the driven gears 5, said sun-gear being rigid, preferably integral, with the steering wheel shaft 12 which axially traverses the cap chambers 13 and 14 and has its lower end 15 journaled in the steering post 1. The wheel shaft 12 may have the two cylindrical sections 16 and 17, the latter projecting to the cap exterior through the opening 18 to carry the steering wheel 19, said shaft section 16 being encompassed by the hollow cylindrical sliding clutch element 20 which may be splined thereto by the key 21 which is rigidly fastened in said shaft section in any suitable manner, said key engaging in the clutch bore groove 22 to effect a permanent rotative relation between said shaft and clutch. A separate piece collar 30 engaging around the shaft section 17 and against the shoulder 31 and disposed against the upper wall of the chamber 13 is adapted to prevent upward axial movement of the wheel shaft.

The lower end of the movable clutch 20 has its outer periphery provided with a series of teeth 23 extending circumferentially thereof, said teeth being adapted to engage or mesh with the teeth 24 formed on the inner periphery of the arcuate stationary clutch element 25 which is rigidly secured within the cap chamber 14 to the cap by screws 33, or in any other suitable manner, whereby the shaft 12 may be locked against rotation. Normally, the series of teeth 23 of the clutch 20 are disposed in a plane below the stationary clutch element 25, that being the driving position of the parts, and to lock the shaft 12 against rotation the clutch 20 must be elevated, this movement being performed by the cam pin 26 of the key controlled tumbler lock 27, said cam pin projecting into the circumferential groove 32 of the clutch 20 and being movable through an arc of approximately one hundred eighty degrees under key action, as is well known in the art. The key lock 27 may be fastened in the cap chamber 28 in any suitable manner and may be of the type which enables the removal of the key when the cam pin 26 is disposed at either limit of its arcuate movement. A coil spring 29 may bear against the upper face of the clutch 20 to facilitate the demeshing of the teeth 23 with the clutch teeth 24 when the driving position is desired, and to assist in maintaining such demeshed relation.

By the use of the clutch element 20 splined to the shaft 12 and having a series of peripheral teeth 23 adapted to mesh with a stationary clutch 25 arranged around said clutch 20 I am enabled to produce a steering wheel lock for motor cars of the Ford type which has a greater number of locking positions than any type now known or in use.

I claim:—

1. In an automobile steering gear lock, the combination with steering gear including a rotary steering post, a housing, a cover for said housing, and planetary driven gears within said housing for steering post actuation, of a steering wheel mount provided with a section arranged interiorly of said housing, said wheel mount section carrying a sun-gear which is in constant mesh with said driven gears, and lock controlled clutch means splined directly to said wheel mount section within said housing cover and movable axially thereof for locking said wheel mount to said housing cover to prevent rotation of said wheel mount.

2. In an automobile steering gear lock, the combination with steering gear including a rotary steering post, a housing, a cover for said housing, and planetary gears within said housing for steering post actuation, of a steering wheel mount provided with a sun-gear which is in constant mesh with said planetary gears, and clutch means splined to said wheel mount within said housing and movable axially thereof for locking said wheel mount to said housing cover to prevent rotation of said wheel mount.

3. In an automobile steering gear lock, the combination with steering gear including a rotary steering post, a housing, a cover for said housing, and driven planetary gears within said housing for steering post actuation, of a rotary steering wheel mount provided with a sun-gear which is in constant mesh with said driven gears, and lock actuated clutch means encompassing said wheel mount and splined thereto, said clutch means being movable axially of said wheel mount for locking the latter to said housing cover to prevent rotation of said wheel mount.

4. In an automobile steering gear, the combination with steering gear including a rotary steering post, a housing, a chambered cover for said housing and driven planetary gears within said housing for steering post actuation, of a rotary steering wheel mount provided with a sun-gear which is in constant mesh with said driven gears, a hollow clutch element encompassing said wheel mount and splined thereto, said clutch element being movable axially of said wheel mount within said housing cover for locking said wheel mount to said housing cover to prevent rotation of said wheel mount, said clutch element being provided with a circumferential peripheral groove, and key controlled means engaging said clutch groove for clutch actuation.

5. In an automobile steering gear lock, the combination with steering gear including a rotary steering post, a housing, a cover for said housing, and driven planetary gears within said housing for steering post actuation, of a rotary steering wheel mount provided with a sun-gear which is in constant mesh with said driven gears, a hollow clutch element encompassing said wheel mount and splined directly thereto, said clutch element being movable axially of said wheel mount and provided with a circular series of teeth for locking said wheel mount to said housing cover to prevent rotation of said wheel mount, and a key controlled lock mounted in said housing cover for actuating said clutch element.

6. In an automobile steering gear lock, the combination with steering gear including a rotary steering post, a housing a cover for said housing, and driven planetary gears within said housing for steering post actuation, of a rotary steering wheel mount provided with a sun-gear which is in constant mesh with said driven gears, a stationary clutch element rigidly mounted within and to said housing cover and laterally of said wheel mount, said clutch element being provided with a plurality of teeth in semi-circular arrangement, and lock actuated clutch means splined to said wheel mount, movable axially thereof and provided with a circular series of teeth which are adapted to engage the interstices of the teeth of said stationary clutch element.

7. In an automobile steering gear lock, the combination with steering gear including a rotary steering post, a housing, a cover for said housing, and driven planetary gears within said housing for steering post actuation, of a rotary steering wheel mount provided with a sun-gear which is in constant mesh with said driven gears, stationary clutch means carried by and within said housing cover above the plane of said driven gears and including an arcuate series of recesses extending about said wheel mount; and lock controlled movable clutch means splined to said wheel mount within said housing, movable axially of said wheel mount and adapted to engage said stationary clutch means to lock said wheel mount against rotation.

8. In a vehicle steering gear lock, the combination with steering gear including a rotary steering post, a housing mounted relatively thereto, a cover secured to said housing, driven gears in said housing for steering post actuation, and a rotatable steering wheel shaft, said shaft carrying a gear which is in mesh with said driven gears, of means for releasably locking said shaft and housing cover together to prevent rotation of the former, said means including an element encompassing said shaft and rotatable therewith, said element being provided with a circular series of recesses, a detent element mounted in said housing cover and adapted to engage a recess of said recessed element, one of said two elements being movable, and a key lock mounted in said housing cover to actuate said movable element.

9. In a steering gear lock, the combination with steering gear including a rotary steering post, a housing mounted relatively thereto a cover secured to said housing, driven planetary gears in said housing for steering post actuation, and a rotatable steering wheel shaft, said shaft carrying a sun-gear which is in constant mesh with said driven gears, of means for releasably locking said shaft and housing cover directly together to prevent rotation of the former, said means including an element encompassing said shaft and rotatable therewith, said element being provided with a part which carries a circular series of recesses arranged about said shaft, a detent element mounted in said housing cover and adapted to engage one or more of the recesses of said shaft encompassing element, one of said two elements being movable parallel with the axis of said shaft, and a key-lock mounted in said housing cover to actuate said movable element.

10. In a steering gear lock, the combination with steering gear including a rotary steering post, a housing mounted relatively thereto, a cover secured to said housing, driven gears in said housing for steering post actuation, and a rotatable steering wheel shaft, said shaft carrying a gear which meshes with said driven gears, of key lock controlled means for releasably locking said shaft and housing cover together to prevent rotation of the former, said means including a circular separate part element encompassing said shaft and rotatable therewith, said element being provided with a circular series of recesses adjacent its outer periphery, and a detent element mounted in said housing cover and adapted to engage a recess of said recessed element, one of said two elements being movable and under control of said key lock.

11. In an automobile steering gear lock, the combination with a steering gear including a rotary steering post, a housing, a cover for said housing, and planetary driven gears within said housing for steering post actuation, of a steering wheel mount provided with a section arranged interiorly of said housing, said wheel mount section carrying a sun-gear which is in constant mesh with said driven gears, a hollow clutch element encompassing said wheel mount section, a complementary tongue and groove connection between the bore of said clutch and said wheel mount, said clutch being in constant rotatable relation with said wheel mount and movable longitudinally thereof, and lock controlled means for actuating said clutch element for locking said wheel mount to said housing cover to prevent rotation of said wheel mount.

12. In an automobile steering gear lock, the combination with a steering gear including a rotary steering post, a housing, a cover for said housing, and planetary driven gears within said housing for steering post actuation, of a steering wheel mount provided with a section arranged interiorly of said housing, said wheel mount section carrying a sun-gear which is in constant mesh with said driven gears, a hollow clutch element encompassing said wheel mount section and provided with a circular series of clutch teeth extending therearound, a complementary tongue and groove connection between the bore of said clutch element and said wheel mount, said clutch element being in constant rotatable relation with said wheel mount and movable longitudinally thereof, a stationary clutch element within said housing cover and provided with a semi circular series of teeth, and lock controlled means for actuating said movable clutch element to cause engagement of the teeth thereof with the teeth of said stationary clutch element for locking said wheel mount to said housing cover to prevent rotation of said wheel mount.

In witness whereof I have hereunto affixed my signature this 1st day of June, 1923.

LOUIS C. VANDERLIP.